March 14, 1967  H. S. NAGIN ET AL  3,308,725
PAVING ELEMENT AND PAVING EMPLOYING THE SAME
Filed Oct. 1, 1964  3 Sheets-Sheet 1

INVENTORS
HARRY S. NAGIN.
LEON NAGIN.
HAROLD NAGIN.
BY Christy, Parmelee & Strickland
ATTORNEYS.

INVENTOR.
HARRY S. NAGIN.
LEON NAGIN.
HAROLD NAGIN.

March 14, 1967    H. S. NAGIN ET AL    3,308,725
PAVING ELEMENT AND PAVING EMPLOYING THE SAME
Filed Oct. 1, 1964    3 Sheets-Sheet 3

INVENTOR.
HARRY S. NAGIN.
LEON NAGIN.
HAROLD NAGIN.
BY
Christy, Parmelee & Strickland

ATTORNEYS.

United States Patent Office 3,308,725
Patented Mar. 14, 1967

3,308,725
PAVING ELEMENT AND PAVING EMPLOYING THE SAME
Harry S. Nagin, Bala Cynwyd, Leon Nagin, Churchill Borough, and Harold Nagin, Pittsburgh, Pa., assignors to Reliance Steel Products Company, McKeesport, Pa., a corporation of Pennsylvania
Filed Oct. 1, 1964, Ser. No. 400,795
6 Claims. (Cl. 94—4)

This invention relates to the art of paving including broadly applications where vehicular or pedestrian traffic utilizes the pavement, although the invention is more especially applicable to pavements for vehicular traffic, including landing strips for airplanes, and is for a paving element designed to be prefabricated, and pavements utilizing the same.

During the past several years, we, our assignee, and others have made various application of pavements as discolsed in Nagin and Russell Patent No. 2,948,201, granted Aug. 9, 1960, and the results after prolonged exposure to weather and heavy traffic have now become available. Such paving involves the use of epoxy resin and abrasive grit to the surface of the pavement.

It has been established that consistently good results can be obtained economically only in the summer months when high ambient temperatures prevail, limiting the season in which such paving may be put down to a relatively short summer period in those areas of the country that are subject to wide temperature fluctuation. It has also been established that such paving put down early in the day when temperatures are rising are generally more satisfactory and may be more quickly opened to traffic than applications made later in the day when temperatures start to fall. It has been demonstrated that improved adhesion is secured where a slurry of the resin with finely-divided aggregate is flowed onto the pavement, after which the abrasive grains forming the top surface are pressed on by rolling. This is because the coefficient of expansion of the resin-sand mixture is more nearly the same as that of the concrete. In addition, the best results for long periods of time have been secured where, on a bridge floor formed of a grating filled with concrete, heavy expanded metal has been tack-welded to the grating and the resin-abrasive mix then applied to the floor over this expanded metal. A panel of paving so put down about ten years ago on the Manhattan Bridge in New York City is still in outstandingly good condition.

Moreover, in the case of orthotropic bridges, a satisfactory and economic riding surface over the metal plate forming the bridge deck has not been obtainable. Asphalt which is generally used is relatively short-lived.

The present invention is for paving constructed from prefabricated panels or slabs in the general nature of shallow metal pans which are level full of a mixture of epoxy resin and aggregate with a surface of abrasive grains pressed into it, with elements outside the pans for securing them in place on a metal deck, or concrete base. These panels may be made under controlled conditions with elevated temperatures to cure the resin and bake it into the metal, and may be subsequently applied to the surface on which they are to be used with little regard to prevailing weather conditions.

The invention has for a principal object to provide an improved pavement.

A further important object is to provide a unique prefabricated paving panel designed to give long service.

A further object is to provide a paving panel and pavement which is relatively light in weight so that it may be used without unduly increasing the dead weight of a bridge floor.

A further object is to provide in a bridge floor having a riding surface covered with panels a vibration-damping layer interposed between the panels and bridge surface which also serves to integrate them with the deck of the bridge.

These and other objects and advantages may be more fully understood by reference to the accompanying drawings, in which.

Figure 1:
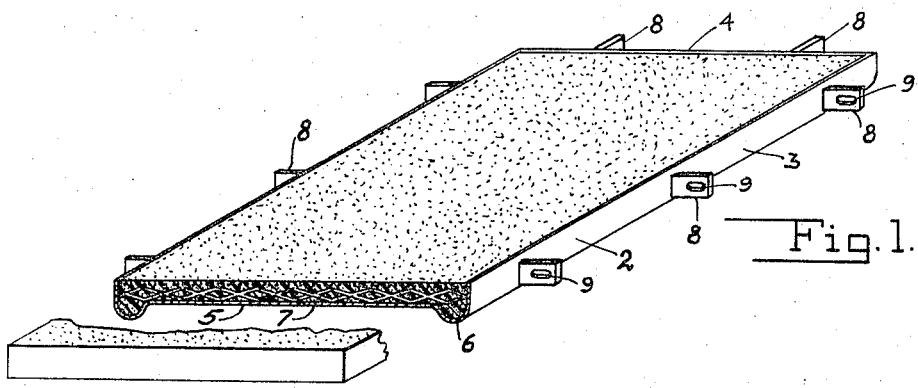
FIG. 1 is a perspective view of a portion of a single panel broken away to reveal the interior construction.

Referring to FIG. 1, 2 designates generally a pan formed of sheet metal, such perhaps as No. 10 gauge sheet steel. It has side walls 3, opposed walls 4, only one of which may be seen in the drawings, and a bottom 5 which is joined to the side and end walls by a marginal downwardly-extending bead 6. The drawings, to show the construction clearly on a small scale, cannot be accurate as to proportions, but typically a pan may be eight to twelve feet long, three feet wide, three-fourths of an inch in total depth, with the bottom 4 raised about one-eighth of an inch above the bottom of the bead 5, or even less, down to perhaps one-sixteenth of an inch.

Welded to the inside bottom of the pan is a sheet 7 of heavy expanded metal, the overall thickness of the expanded sheet being substantially equal to or only slightly less than the depth of the pan from the bottom 5 to the top edges of its side and end walls.

There are welded to the outside of the side walls, and preferably also the end walls, laterally-projecting ears or fins 8, each having an opening 9, preferably horizontally elongated, extending therethrough. These ears are of the order of an inch to an inch and a quarter, for example, in length, and are spaced at intervals along the side and end walls.

After the pans have been formed and the ears applied thereto and the expanded metal is tack-welded into place, epoxy resin and a curing agent therefor, along with a granular aggregate is poured into the pans until they are about level full. The aggregate may be abrasive grains, or it may be sand. In either case, the surface is densely covered over with dry abrasive grains and the surface is then rolled or pressed to embed the grains in the resin, after which excess grains are removed. The surface is thereby so densely covered with abrasive grains as to provide a substantially continuous surface of such grains. After being so prepared, the filled pans are passed through an oven at a selected temperature for a time sufficient to effect curing of the resin. This is generally at a temperature of 200°–225° F. for an hour to an hour and a half.

The epoxy resin used for this purpose is produced by the reaction of bisphenol and epichlorohydrin in a known manner, and is a light syrupy liquid having an epoxy equivalent of 180–195 and a viscosity at 25° C. of 100–160 poises, such as "Epon" 828 sold by Shell Chemical Company and described in its "Technical Bulletin SC: 58–92." The curing agent may be one of several polyfunctional amines of which diethylenetriamine is most commonly used in amounts ranging between 5% and 10% of the weight of the liquid resin.

Figure 2:
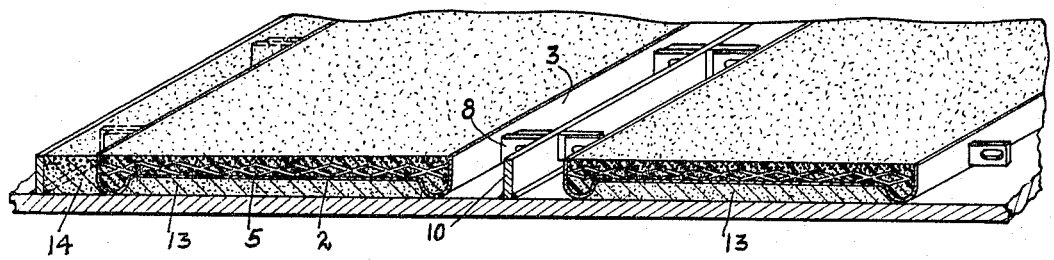
FIG. 2 is a perspective view, partly in section, of a portion of a bridge floor, such as an orthotropic bridge floor with the panels applied thereto.
Figure 3:
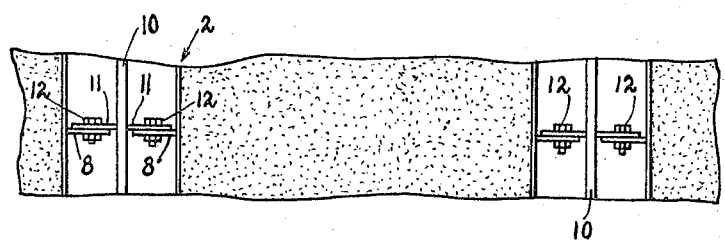
FIG. 3 is a top plan view of a portion of a floor as shown in FIG. 2.

When the resin has been cured, the panels are ready for use. Assuming they are to be used on a metal bridge floor, such as an orthotropic bridge floor having a relatively thick continuous metal plate, then, as shown in FIGS. 2 and 3, parallel metal strips 10 are welded to the bridge floor in the direction in which the panels are to be placed, with the distance between strips being equal to the overall width of the panels, including the ears or fins 8. The strips 10 have similar ears 11 thereon at predetermined spaced intervals corresponding to those on the sides of the panels and so positioned as to lap past the ears of the pans in close relation thereto. When the pans are positioned between the strips, the openings in the ears of the strips and pans register and bolts 12 are passed therethrough and nuts applied to secure the pans to the strips. However, before the pans are put in place, a swath of a kind of mastic composition is applied to the plate in a path of about the width of the bottom of the pan between the beads, or such compound may be applied to both the outside of the pan bottoms and the bridge deck. It is of a thickness to fill the void between the deck and the bottom of the pan. It has several functions. First it cushions the panel against shock while allowing for inequalities of surface between the bottom of the pan and the bridge deck. Secondly it excludes water and air and condensate from beneath the pans to prevent rusting. Thirdly it reduces and dampens vibration and traffic noise and adds strength to the bridge floor. It provides a better construction than would be secured by using a flat bottom pan with no bead and no such filler between the two.

It should be explained that after the resin has cured, the panel becomes a strong rigid unit that will support heavy traffic loads without breaking, so that the mastic or filler under the panels has little need to transmit any direct load to the underlying support. One material may be a non-brittle tar with a sand filler. Gel asphalt with or without added filler, such as sand, may be used.

Other materials which may be used, but which are relatively more expensive are:

(a) Urethane rubber (Du Pont "Adiprene" L–100 with MOCA catalyst is a typical material of this class and is chemically a prepolymer of tetramethylene glycol and toluene diisocyanate and the catalyst is methylene bis orthochloro aniline).

(b) Urethane rubber as described above +50% RT5 coal tar: While the coal tar degrades the physical properties of the rubber, this is not injurious for this particular use and substantially reduces the cost.

(c) Ethylene-vinyl acetate copolymer: A satisfactory commercial grade is Du Pont "Elvax" 40.

(d) Atactic polypropylene: This is a rubbery low polymer available as a byproduct in the manufacture of normal polypropylene.

After the panels have been secured in place, the narrow space between strips 10 and the sides of the pans are filled with ordinary asphalt, as indicated at 14 in FIG. 2. The fins at the ends of the pans may be bolted to the fins of a succeeding pan, or to a transverse short strip similar to the long strips 10, or to individual anchoring elements as hereinafter described, and the space between confronting end walls of the pans is likewise filled with asphalt.

Figure 4:
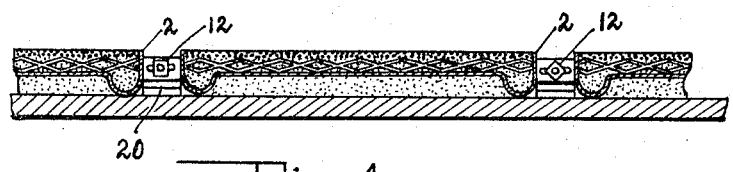
FIG. 4 is a transverse section of a bridge floor with panels showing a modified construction for securing the panels in place.
Figure 5:
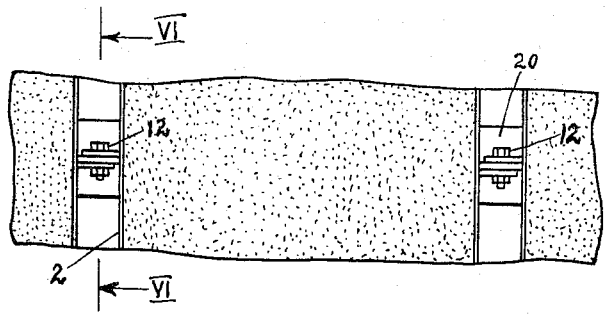
FIG. 5 is a top plan view of FIG. 4.
Figure 6:
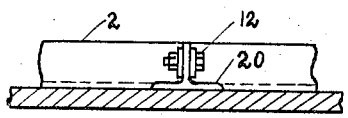
FIG. 6 is a fragmentary longitudinal section in the plane of line VI—VI of FIG. 5.

In FIGS. 4, 5 and 6 there is shown another arrangement of anchoring elements for securing the pans to a metal deck. In this arrangement a clip 20 in the form of a short section of a T-bar is set in inverted position between two adjacent pans and the ears or fins of the pans lap past the upstanding leg of the inverted T and bolts are passed through the fin and the leg. These clips 20 may be first welded to the deck or they may be welded after the pans are set in place, so long as the welding temperatures are kept away from too close proximity to the pans. Such clips may also be used between pan end fins in the arrangement shown in FIGS. 1 to 3, as well as in FIGS. 4, 5 and 6. Asphalt is filled into the spaces between pans, as described in FIG. 2.

Either of the foregoing arrangements may also be applied to worn bridge floors having a steel grating with cells that are filled with concrete.

Figure 7:
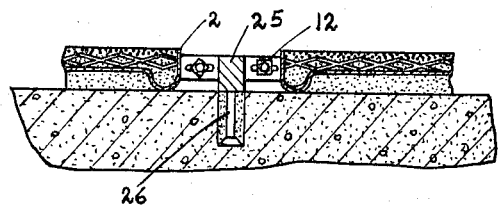
FIG. 7 is a fragmentary transverse section showing the panels applied to concrete.

FIG. 7 illustrates how the same panels as shown in FIGS. 1 to 6 may be used on a concrete road surface. Metal strips 25 are secured to the concrete by anchor studs or bolts 26 set into holes in the concrete, as by filling the holes with a cement or molten lead. These strips correspond to the strips 10 of FIGS. 2 and 3 and the fins on the pans are bolted to fins on the strips 25.

In all cases the voids between pans and the anchor strips or cleats are filled with asphalt or other filler which excludes water. In all cases also a mastic or filler as above described and designated 13 is applied to the supporting surface under the pans.

Figure 8:
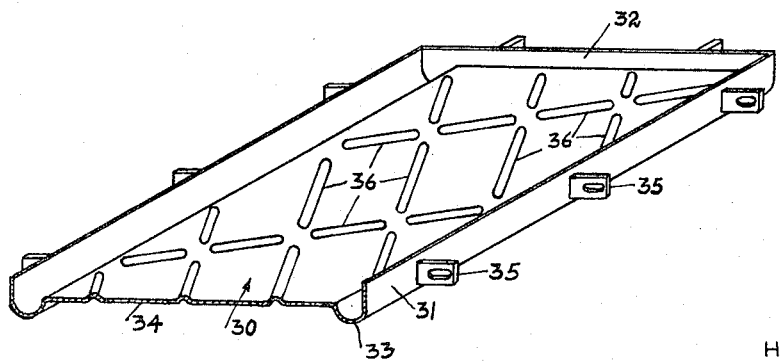
FIG. 8 is a perspective view of one end of an empty panel-forming pan of modified construction.

FIG. 8 shows a modified form of pan basically the same as the one previously described, but with embossed ribs in the bottom to replace the expanded metal, or to augment it in giving increased area and surfaces in different planes to which the epoxy resin may adhere. In FIG. 8 the pan, designated generally as 30, has side walls 31, end walls 32, a marginal bottom bead 33 and a slightly elevated bottom 34. Ears 35 are welded to the side and end walls as in the other forms, so that the pans may be secured in place in the manner described in the previous figures. The filling is not shown, but the pan will be filled with epoxy resin, and aggregate, as previously described. Embossed ribs are indicated at 36.

Figure 9:
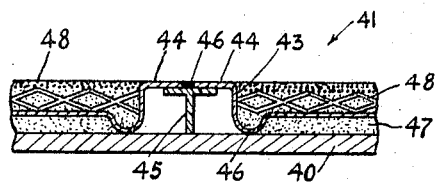
FIG. 9 is a fragmentary sectional view through a flooring showing a still different modification of the pans and securing means.

In the modification shown in FIG. 9 the arrangement is such as to eliminate any filling between the pans. In this view 40 designates a base structure which may be a metal plate, or concrete, or a grating type of bridge floor, wherein there is a grating with concrete filled into the cells. Panels designated generally as 41 are placed over the base. These panels have a bottom 42 and upwardly-extending side and end walls 43. Projecting outwardly from the top edge of the side and end walls is a lateral flange 44. Secured to the base 40 as by welding in the case of metal flooring, or by embedding in the case of a concrete base is a T section 45 which extends lengthwise between the panels. The flanges 44 of adjacent panels lap over this T section. Welding metal 46 is flowed into the space between the confronting flanges 44 and onto the top of the T section, filling the crevices so as to exclude moisture and at the same time welding the pans permanently to the base. As in previous constructions, the pans are here shown as having the bottom 42 elevated above a marginal bead 46, and there is a vibration dampening filler 47 in the space between the base and the bottom 42. The pans are filled with epoxy resin and aggregate as previously described preferably with expanded metal welded to the bottoms of the pans. This filling is indicated at 48.

Figure 10:
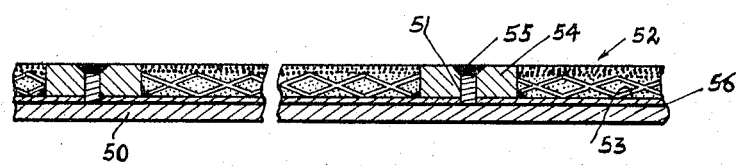
FIG. 10 is a view similar to FIG. 2 showing still another modification.
Figure 11:
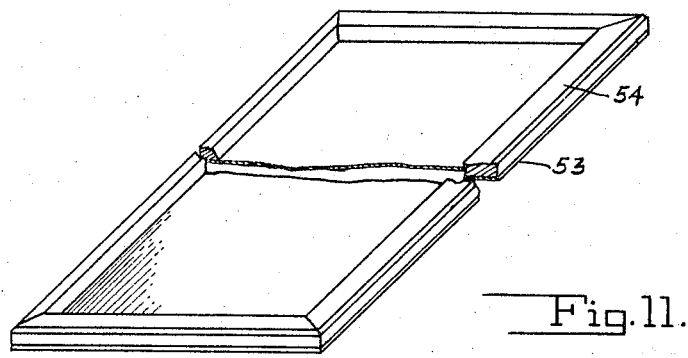
FIG. 11 is a perspective view of a panel such as shown in FIG. 10.

In the modification shown in FIG. 10 the pans are formed by welding solid sections around the edges of a bottom-forming panel. In this view 50 designates a base which may be of any of the constructions previously described, being here shown as a metal plate. Attached to it at intervals are parallel bar sections 51 of slightly less height than the depth of the pans which are here designated generally as 52. The pans 52 comprise a sheet or panel 53 of heavy gauge sheet metal or light plate around the edges of which are welded or otherwise secured bar sections 54 so as to form a pan as shown in FIG. 11, the top area of which is recessed to retain a filling of epoxy resin and aggregate as in the previous forms, there preferably also being a layer of expanded metal embedded in the filling. The outer edges of the bar sections 54 are chamfered.

These panels are laid against the upstanding bars 51 with the sides in abutting relation thereto. Welding metal 55 is then flowed into the recesses formed between the chamfered outer edges of the bars 54 of the pans and the top of the bar 51 on the base. In this view as in FIG. 9 the welding metal excludes moisture from between the pans, while at the same time anchoring the pans to the base. In FIG. 11 the pan is shown as it is constructed before the filling material is put into it. Also as indicated by the heavy line in FIG. 10, a layer of vibration-damping material is provided at 56 between the bottoms of the pans and the supporting base. This can be painted onto the top of the surface 50, or to the under sides of the pans, and it not only serves to dampen vibration, but automatically takes care of any irregularities between the surface of the deck and the suporting base and excludes moisture or air which may carry moisture from between the paving panel and the base on which it is carried, and to a certain extent integrates the panels for movement with a bridge floor to which the panels are applied.

Figure 12:
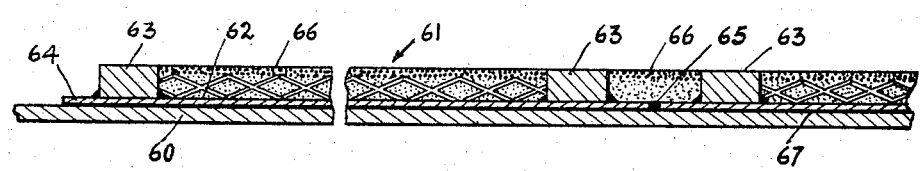
FIG. 12 is a view similar to FIG. 10 showing still another modification.

FIG. 12 shows an arrangement quite similar to that shown in FIGS. 10 and 11, but in this construction the bottom of the pans or panels extend beyond the side walls. In this view 60 designates a supporting base which may be of any of the constructions previously described, as for example a metal plate constituting the deck of an orthotropic bridge. The pans designated generally as 61 comprise a bottom plate 62 of generally rectangular form and constituted either of heavy gauge sheet metal or light plate construction. Secured to the top thereof but set inwardly from the marginal edges are bars 63 which are welded or otherwise secured to the base plate and which constitute the side walls. The projecting margins 64 of the bottom plate form extensions for attaching the paving panels to the base. In the case of a bridge floor having a metal deck, welding metal 65 may be flowed into the crevice between the confronting extensions 64 to weld the pans to the deck, or strips such as those shown at 51 in FIG. 10 may be attached to the base.

In this construction as in the previous construction the pans are filled with epoxy resin and aggregate hardened in situ, the filling being designated as 66, and with this construction, too, there may be some such means as expanded metal to more firmly retain the epoxy resin. After the floor of FIG. 12 has been secured in place, the space between the walls 63 of adjacent panels may be filled with asphalt or similar filling material which could also be epoxy resin and aggregate similar to the filling inside the pans. Also in this construction a film of vibration dampening material 67 is applied between the bottoms of the pans and the deck or base surface to which the pans are secured.

In all of the modifications here described, the epoxy resin and aggregate are cured in situ in the pans. In all of them the aggregate may be formed with a slurry of sand and epoxy resin with abrasive grains pressed into the top as described, or abrasive grains may constitute the entire aggregate. The use of expanded metal is particularly desirable because expanded metal embedded in the epoxy resin and aggregate constitutes a reinforcement the same as metal embedded in concrete provides a reinforcement, substantially increasing its tensile strength, and therefore its resistance to impact, in that it serves to distribute impact and load stresses throughout the area of the panel. Therefore, even though the pans may be of relatively light gauge metal, the filling imparts great rigidity and strength to them, especially when so reinforced. The provision of upstanding side walls on the panels is of importance not only for the purpose of initially confining the resin and aggregate when it is in a flowable or spreadable condition, but the metal prevents any breaking away or chipping of the edges of the filling under the impact of traffic, whereas with the metal sides surrounding the filling of epoxy resin there is more likely to occur a breaking away of the resin at the edges which is aggravated as wear develops.

In most cases the fastening at the ends of the pans may be the same as that used at the sides of the pans, or in some cases the fastening at the sides may be adequate so that any space between the ends of the pans need simply be filled in with asphalt or other filling to level up the surface.

With the present invention, utilizing sheet pans, the resin can be prepared and cured by experienced workmen under factory-controlled conditions and at optimum temperature. By using a sand or abrasive filler in the resin, the coefficient of thermal expansion of the mix is reduced to more closely match that of the metal. The surface of the panel, being formed by pressing dry grit into the surface, is abrasive and wear-resisting.

When in place on the bridge floor, each panel expands or contracts substantially independently so that stress cracks do not develop as in a monolithic layer. Overall expansion and contraction of the base pavement may not produce loosening or cracking of the composition in individual pans. The fastening of the pans to the deck of the bridge or concrete base is mechanical, not an adhesive bond, and any welding is done either before the panels are in place, or at a sufficient distance from the epoxy resin that damage to the resin is avoided. The mastic or filling under the panels compensates for irregularities in the surface of the base and pan; fills the space to exclude air and moisture, and reduces sound. The filling of the spaces around the pans with asphalt or other filler presents only a narrow area of such filler to traffic, so that it does not readily "cup" under traffic. It allows for expansion and contraction, and also dampens noise and vibration. It may be readily removed should it be necessary to replace a pan for any reason, but at the same time prevents the nuts and bolts which anchor the panels in place from losening. All of the fastening is effected on the deck or paving surface While we have shown and described certain specific embodiments of our invention, it will be understood that various changes and modifications may be made within the contemplation of our invention and under the scope of the following claims.

We claim:

1. A pavement comprising a continuous planar base structure, a plurality of panels arranged in spaced parallel relation over the base structure, each panel comprising a rectangular shallow pan having a bottom, upwardly-extended side and end walls, a marginal bead of each pan projecting below the level of the bottom a slight distance to form a space between the base on which the pan sets and the bottom of the panel, a spreadable composition applied to the base filling said space, the pans being filled with a mass of epoxy resin and aggregate hardened in situ in the pans, anchoring elements on the sides of the pans extending into the spaces between the pans accessible from above the pans, anchoring means on the base in said spaces to which said elements are secured, and a filling material in said spaces and embedding the said elements and anchoring means.

2. A pavement as defined in claim 1 in which said spreadable composition is a rubbery plastic substance.

3. A pavement comprising a continuous planar base structure, a plurality of panels arranged in spaced parallel relation over the base structure, each panel comprising a rectangular shallow pan having a bottom, upwardly-extended side and end walls, the pans being filled with a mass of epoxy resin and aggregate hardened in situ in the pans, anchoring elements on the sides of the pans extending into the spaces between the pans and accessible from above the pans, said elements comprising laterally-projecting fins, anchoring means on the base in said spaces, said anchoring means on the base having extensions to which said fins on the pans are bolted, and a filling material in said spaces and embedding the said elements and anchoring means.

4. A pavement as defined in claim 3 and further including a vibration-dampening material on the base under the pans.

5. A pavement comprising a base structure, a plurality of panels arranged in spaced parallel relation over the base structure, each panel comprising a rectangular shallow pan having a bottom, side and end walls, the pans being filled with a mass of epoxy resin and aggregate hardened in situ in the pans, anchoring elements on the sides of the pans extending into the spaces between the pans, strips secured to the base extending lengthwise between the pans, said strips having lateral extensions therealong to which the anchoring elements on the pans are secured, and a water-excluding filling in the spaces between the strips and the sides of the pans and filling said spaces level with the tops of the strips and the top edges of the pans.

6. A paving panel comprising a generally rectangular shallow pan having a bottom, side and end walls, a rigid mass of cured epoxy resin and granular aggregate completely filling the pan and cured in situ in the pan, and extensions projecting from the sides of the pan at intervals thereabout for securing it to an anchoring means on the surface where it is to be used, the side and end walls of the pan being joined to the bottom through a marginal bead extending around the sides and ends of the panel that projects below the level of the bottom so as to elevate the bottom above the surface on which the pan is set.

References Cited by the Examiner

UNITED STATES PATENTS

| | | | |
|---|---|---|---|
| 1,393,699 | 10/1921 | Purcell | 94—13 |
| 1,893,742 | 1/1933 | Heidman | 94—3 |
| 1,929,478 | 10/1933 | Bunker | 14—73 X |
| 2,017,832 | 10/1935 | Hovey | 14—73 X |
| 2,102,276 | 12/1937 | Murphy | 94—5 X |
| 2,324,131 | 7/1943 | Boylan | 94—3 |
| 2,377,211 | 5/1945 | Cocken | 94—13 |
| 2,478,993 | 8/1949 | Wing | 94—13 |
| 2,960,918 | 11/1960 | Nagin | 94—5 X |

FOREIGN PATENTS 855,056   2/1940   France

JACOB L. NACKENOFF, *Primary Examiner.*